United States Patent
Kusumo-Rahardjo et al.

(10) Patent No.: US 7,265,873 B1
(45) Date of Patent: Sep. 4, 2007

(54) IMAGE PROCESSOR THAT PERFORMS EDGE ENHANCEMENT USING A DYNAMIC THRESHOLD

(75) Inventors: Winarto Kusumo-Rahardjo, Irvine, CA (US); Larry M. Allen, Anaheim, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/290,854

(22) Filed: Apr. 13, 1999

(51) Int. Cl.
*H04N 1/409* (2006.01)
*G06T 5/00* (2006.01)
*G06T 7/00* (2006.01)

(52) U.S. Cl. ...................... 358/2.1; 358/3.27; 358/462; 358/465; 382/176; 382/199; 382/266

(58) Field of Classification Search ................. 358/2.1, 358/3.14, 3.15, 3.21, 3.22, 462, 465, 466, 358/3.27; 382/176, 173, 270, 199, 266
See application file for complete search history.

(56) References Cited

OTHER PUBLICATIONS

J. C. Stoffel and J. F. Moreland, "A Survey of Electronic Techniques for Pictorial Image Reproduction", *IEEE Transactions on Communications*, vol. Com-29, No. 12, Dec. 1981, pp. 1898-1924.
Keisuke Nakashima, et al., "High-Quality Image Processing Architecture for Facsimiles", *Journal of Electronic Imaging*, vol. 1(1), Jan. 1992, pp. 61-67.
William K. Pratt, *Digital Image Processing, Second Edition*, A Wiley-Interscience Publication, 1991, pp. 491-555.
Rafael C. Gonzalez, *Digital Image Processing, Second Edition*, Addison-Wesley Publishing Company, Nov. 1987, pp. 176-182.

*Primary Examiner*—Scott A. Rogers
(74) *Attorney, Agent, or Firm*—Jackson Walker L.L.P.; Christopher J. Rourk

(57) ABSTRACT

An image processing system that performs edge-enhancement on an image. The image processing system processes a region of the image at a given time. One specific pixel of an image region is compared to several surrounding pixels to determine the existence of a black edge or a white edge in the image. Additionally, the image processing system includes a classifier that determines whether the image is substantially text-like or substantially photo-like. When the image is substantially text-like, a dynamic black threshold is used to determine the existence of a black edge within the image. The dynamic black threshold is modified during the processing of the image by the image processing system as a function of the relationship between the one specific pixel to at least one other of the several surrounding pixels. The image processing system selectively applies a first threshold scheme or a second threshold scheme upon identification to the image depending on the characteristics of the one specific pixel. Using the image processing system as described herein, high frequency content, namely the sharpness of the image, is preserved while low frequency content within the image is maintained smooth thereby providing a high visually perceptually quality of the image after having performed image processing. The present invention provides a novel manner of performing edge enhancement using a dynamic threshold in certain instances and a fixed threshold in others.

22 Claims, 7 Drawing Sheets

IMAGE PROCESSOR THAT PERFORMS EDGE ENHANCEMENT USING A DYNAMIC THRESHOLD

BACKGROUND

1. Technical Field

The present invention relates generally to image processing, and; more particularly, it relates to image processing that employs edge detection in an image processing system.

2. Related Art

Conventional image processing systems suffer from many deleterious effects. One particular limitation when dealing with limited resolution of various media and hardware used to extract image data from a printed medium is the inability to maintain high-quality, visual perceptual characteristics of the high frequency components of the image data. Typical image processing systems of limited resolution capability commonly fail to preserve the high frequency component of the image data absent the implementation of a system or method employing some high frequency component image enhancement.

Another deleterious effect of conventional image processing systems is the creation of artifacts during enlargement and reduction of image data. These artifacts typically result from the image processing system's inability to adapt its image processing scheme to accommodate various and diverse areas of the image data. For example, the typical method wherein conventional image processing systems handle different image data regions within a given data image identically results in the creation of artifacts in the high frequency data regions. This situation is commonly referred to as an under-allocation of processing resources.

Alternatively, some conventional image processing systems employ highly intensive computations throughout an entire image to be sure to preserve any high frequency component data contained within the image. This situation is commonly referred to as an over-allocation of processing resources. Such systems typically suffer from an undesirably inefficient allocation of computational and processing resources. For regions that do not require handling of the image data in such a highly computationally intensive manner, the dedicated processing resources to these regions are typically far beyond that which is required. Thus, conventional image processing systems fail to provide a solution that can accommodate both high frequency and low frequency image data regions while maintaining efficient system performance and high perceptual quality image data after processing.

Moreover, conventional image processing systems that employ highly complex methods typically dedicate large amounts of processing resources provide high perceptual quality image processing for image data regions. Typically, however, they do not provide for varying processing methods depending on the particular region within a given set of image data. For example, conventional image processing systems typically fail to achieve sharpening of the image data within regions of high frequency while simultaneously achieving smoothing of the image data within regions of low frequency.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an image processing system that performs edge-enhancement on an image. The image processing systems built in accordance with the present invention can handle image data having varying characteristics. In certain embodiments of the invention, the present invention includes an image classifier that identifies the image type of the image. This classification is performed using at least one of the varying characteristics of the image. The invention also includes a processing circuit that selectively applies at least one image processing threshold scheme to the image data based upon identification of the at least one of the varying characteristics of the image. The at least one of the varying characteristics of the image is a pixel characteristic determined using at least one additional pixel characteristic from at least one additional pixel in certain embodiments of the invention.

In other embodiments of the invention, the present invention includes an image filter that operates cooperatively with the image classifier. The invention also includes a white edge detector and a black edge detector. The white edge detector or the black edge detector is operated depending on the image region type that is identified depending on the at least one of the varying characteristics of the image. Alternatively, the white edge detector or the black edge detector is operated depending on the image region type that is identified depending on the overall image type as determined by the classifier.

The image processing scheme that is applied by the image processing systems built in accordance with the present invention is a substantially constant threshold scheme in certain embodiments of the invention. Alternatively, the image processing scheme is a substantially dynamic threshold scheme in other embodiments of the invention. If desired, both a substantially constant threshold scheme and a substantially dynamic threshold scheme are applied to the image data.

Various aspects of the invention can also be found in an image processing method used to perform edge-enhancement to an image having varying characteristics. the method includes classifying the image as a function of its image type. The method also includes selectively applying a threshold scheme upon identification of at least one of the varying characteristics of the image. The method employs at least one or both of a substantially constant threshold scheme or a substantially dynamic threshold scheme.

Other aspects, advantages and novel features of the present invention will become apparent from the following detailed description of the invention when considered in conjunction with the accompanying drawings.

DETAILED DESCRIPTION

Figure 1:
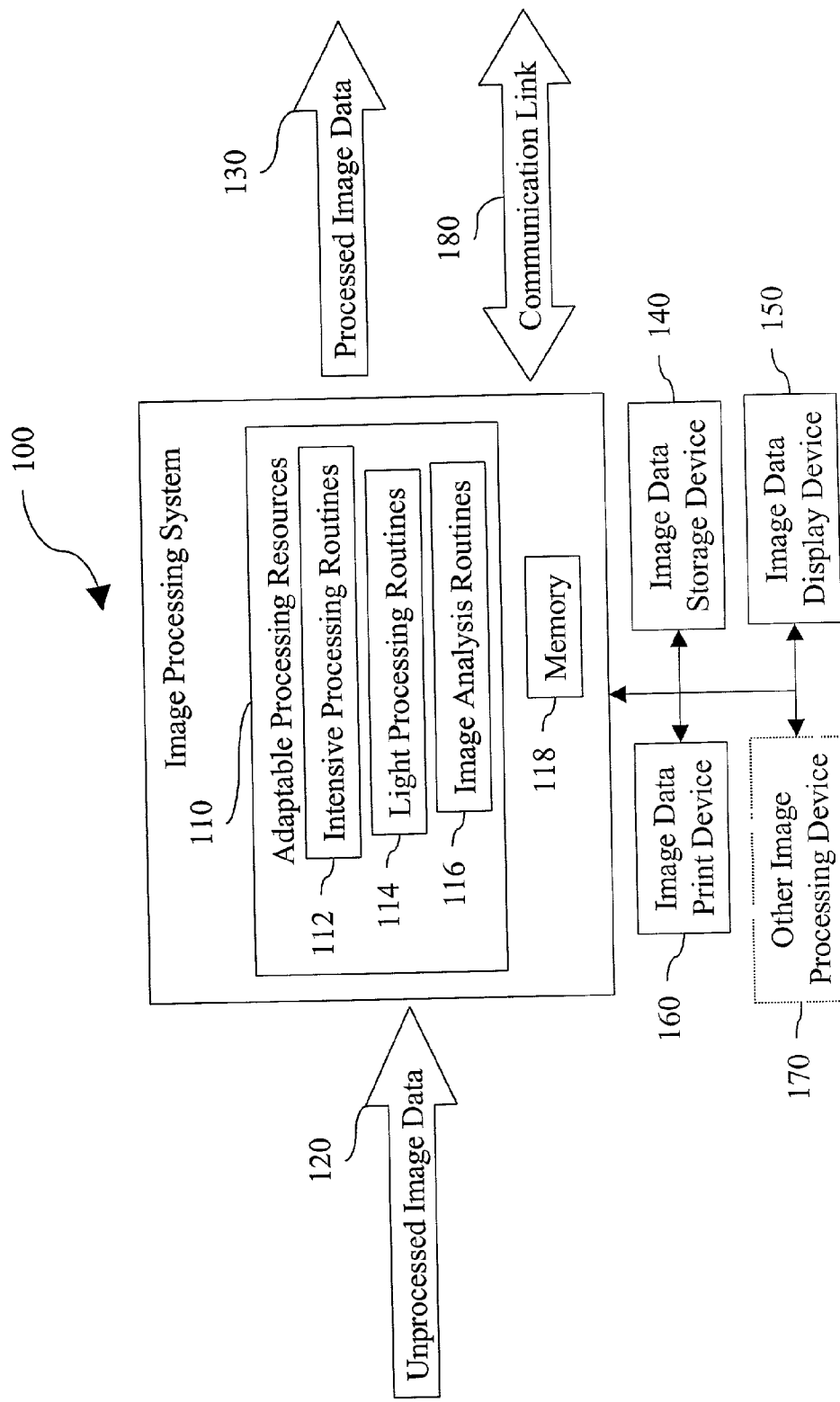
FIG. 1 is a system diagram depicting the present invention that, in one embodiment, is an image processing system that performs image enhancement on a plurality of image data.

FIG. 1 is an image processing system 100 depicting the present invention that, in one embodiment, performs image enhancement by taking in a plurality of unprocessed image data 120 and outputs a plurality of processed image data 130. The image processing system 100 contains adaptable processing resources 110 and a memory 118 for performing image processing on the plurality of unprocessed image data 120. The adaptable processing resources 110 of the image processing system 100 is capable to perform intensive processing routines 112, light processing routines 114, and an image analysis routines 116. The image analysis routines 116 of the adaptable processing resources 110 permit the image processing system 100 to intelligently allocate the intensive processing routines 112 and the light processing routines 114 for processing the plurality of unprocessed image data 120.

For example, if the plurality of unprocessed image data 120 is of one a first data type, then the intensive processing routines 112 are invoked. Alternatively, if the plurality of unprocessed data 120 is of one a second data type, then the light processing routines 114 are invoked. The decision making of which of the intensive processing routines 112 and the light processing routines 114 are invoked is performed, at least in part, upon using the image analysis routines 116 to classify the plurality of unprocessed image data 120 into the first or the second data types. This intelligent decision making of which of the intensive processing routines 112 and the light processing routines 114 permits efficient allocation of the processing resources of the image processing system 100. The adaptable processing resources 110 help avoid inefficient over-allocation on the plurality of unprocessed image data 120 having substantial portions of low frequency image data. The intensive processing routines 112 are used on portions of the plurality of unprocessed image data 120 containing substantially high frequency image data, and the light processing routines 114 are used on portions of the plurality of unprocessed image data 120 containing substantially low frequency image data. Efficient use of the image processing system 100 is achieved while minimizing undesirable artifacts in the plurality of unprocessed image data 120.

After processing the plurality of unprocessed image data 120 using the image processing system 100, the plurality of processed image data 130 is generated. A number of peripheral devices may interact with the image processing system 100 for displaying, storing, or transmitting the plurality of processed image data 130. For example, a communication link 180 is used to transmit the plurality of processed image data 130 to another device in certain embodiments of the invention. An image data print device 160 is used to generate reproductions of the plurality of processed image data 130. If desired, an image data storage device 140 is used to keep the plurality of processed image data 130 for later use. The communication link 180, in certain embodiments of the invention, is used to transmit the plurality of processed image data 130 to the image data storage device 140 or to another image data storage device (not shown). An image data display device 150 extracts either the plurality of processed image data 130 that has been stored in the image data storage device 140 or the plurality of processed image data 130 immediately upon its being generated. Another image processing device 170 is also incorporated in certain embodiments of the invention.

In certain embodiments of the invention, the image processing system 100 is processing circuitry that performs the loading of the plurality of unprocessed image data 120 into the memory 118 from which selected portions of the plurality of unprocessed image data 120 are processed in a sequential manner. If the processing circuitry possesses insufficient processing capability to handle the entirety of the plurality of unprocessed data 110 at a single, given time, then the processing circuitry may employ any method known in the art that transfers data from a memory for processing and returns the plurality of processed image data 130 to the memory. Alternatively, the image processing system 100 is a system that converts raw image data (shown by the plurality of unprocessed image data 120) into image data suitable for printing (shown by the plurality of processed image data 130) using the image data print device 160. Various devices may be used to perform the printing of the image data print device 160 including color photo-copy machines, color facsimiles, color printers, black and white printers, and digital printers. In other embodiments of the invention, the image processing system 100 is a system that converts raw image data into image data suitable for display using the image data display device 150. Various displays may be used for the image data display device 150 in accordance with the present invention including monitors and other media capable of displaying digital image data. The image processing system 100 converts image data that is already in a form suitable for printing by the image data print device 160, yet additional processing is performed to improve the visible perceptual quality of the image data for reproduction. In particular, this additional processing is image enhancement in certain embodiments of the invention.

Figure 2:
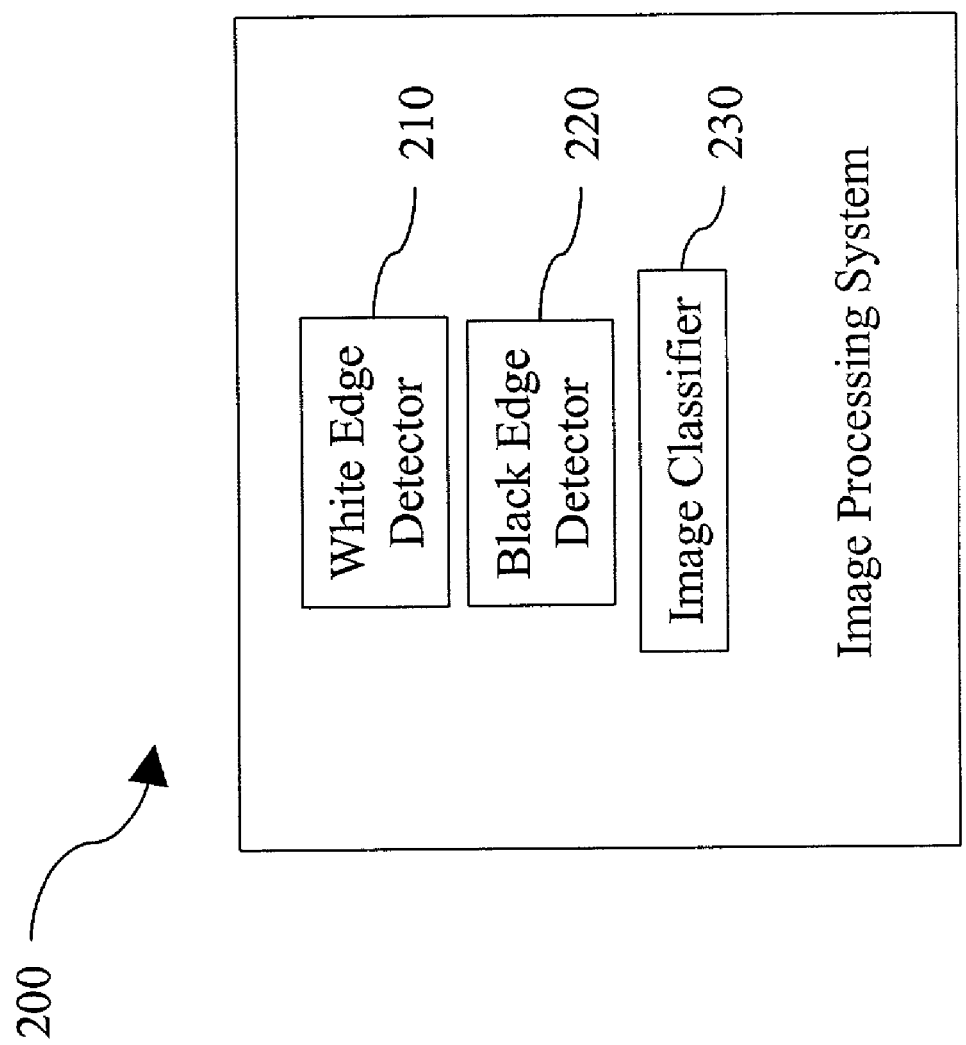
FIG. 2 is a system diagram depicting an image processing system built in accordance with the present invention as described in FIG. 1.

FIG. 2 is a system diagram depicting an image processing system built in accordance with the present invention as described in FIG. 1. The system diagram of FIG. 2 is, in one embodiment, an image processing system 200. The image processing system 200 has a white edge detector 210, a black edge detector 220, and an image classifier 230. The image classifier 230 operates cooperatively with at least one of the white edge detector 210 and the black edge detector 220 for processing a plurality of image data. The plurality of image data may be viewed to be the plurality of unprocessed image data 120 as described in FIG. 1. The image classifier 230 analyzes a predetermined region of the image data and identifies it as a substantially text-like region or a substantially photo-like region. The image data is then classified as being either a text image type or a photo image type.

In certain embodiments of the invention, the white edge detector 210, the black edge detector 220, and the image classifier 230 all operate cooperatively in the image processing system 110 described in FIG. 1. Each of the white edge detector 210, the black edge detector 220, and the image classifier 230 contains internal processing circuitry to perform their respective function. The processing circuitry is performed using combinations of digital signal processors (DPSs), logic circuitry, and other hardware known to those skilled in the art for performing image processing.

Figure 3:
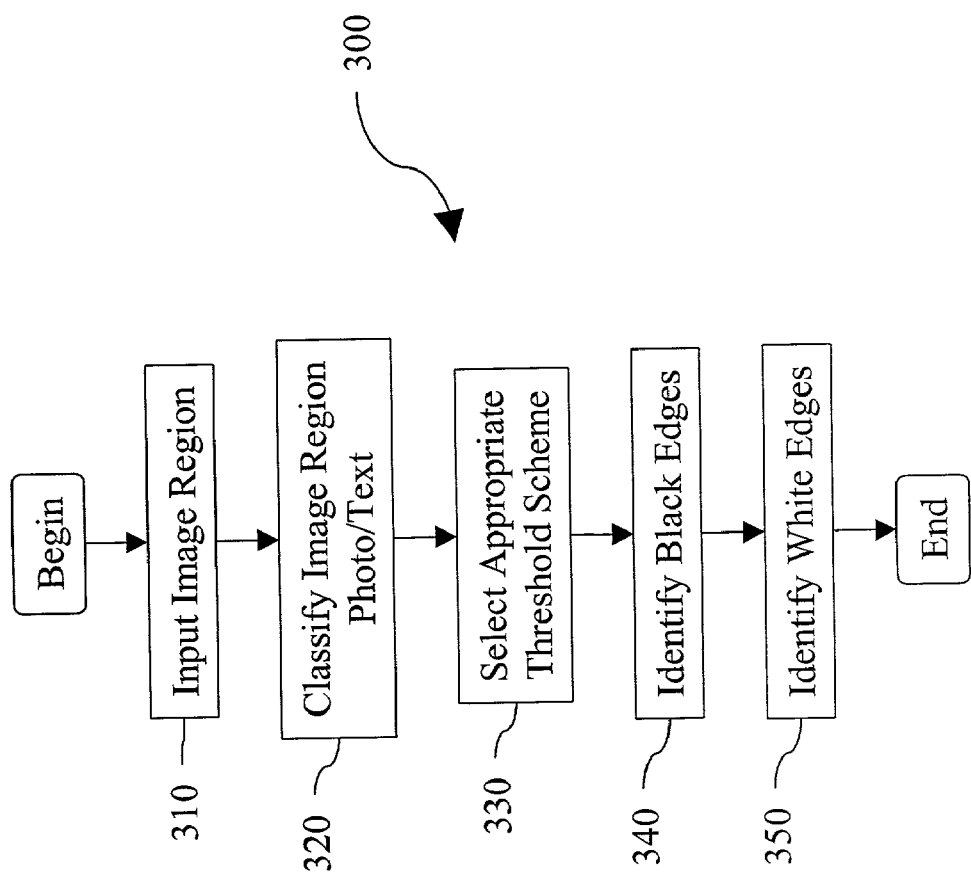
FIG. 3 is a functional block diagram depicting an embodiment of the present invention that selects an appropriate threshold scheme to an image.

FIG. 3 is a functional block diagram 300 depicting an embodiment of the present invention that selects an appropriate threshold scheme to an image. In a block 310, a region of an image data is input into an image processing system capable of performing image data management. In a block 320, the region of the image data is classified as being either a substantially image-like region or a substantially text-like region. Depending on the classification performed on the region of the image data in the block 320, an appropriate threshold scheme is selected in a block 330. The threshold scheme is used in subsequent blocks to perform edge enhancement of the region of the image data. For regions of the image region that are substantially rough, one particular threshold is chosen. Alternatively, for regions of the image region that are substantially smooth, another threshold is chosen. In a block 340, black edges of the image region are identified. Similarly, in a block 350, white edges of the image region are identified.

All of the functional blocks performed in the functional block diagram 300 may be performed using the image processing systems 110 and 200 described in FIGS. 1 and 2. For example, the classification of the image region as being either a substantially image-like region or a substantially text-like region, performed in the block 320 of FIG. 3, is performed using the image classifier 230 of FIG. 2 in one embodiment of the invention. Similarly, the identification of the black edges in the block 340 and the identification of the white edges in the block 350 of FIG. 3 are performed using the white edge detector 210 and the black edge detector 220 in FIG. 2, respectively.

Figure 4:
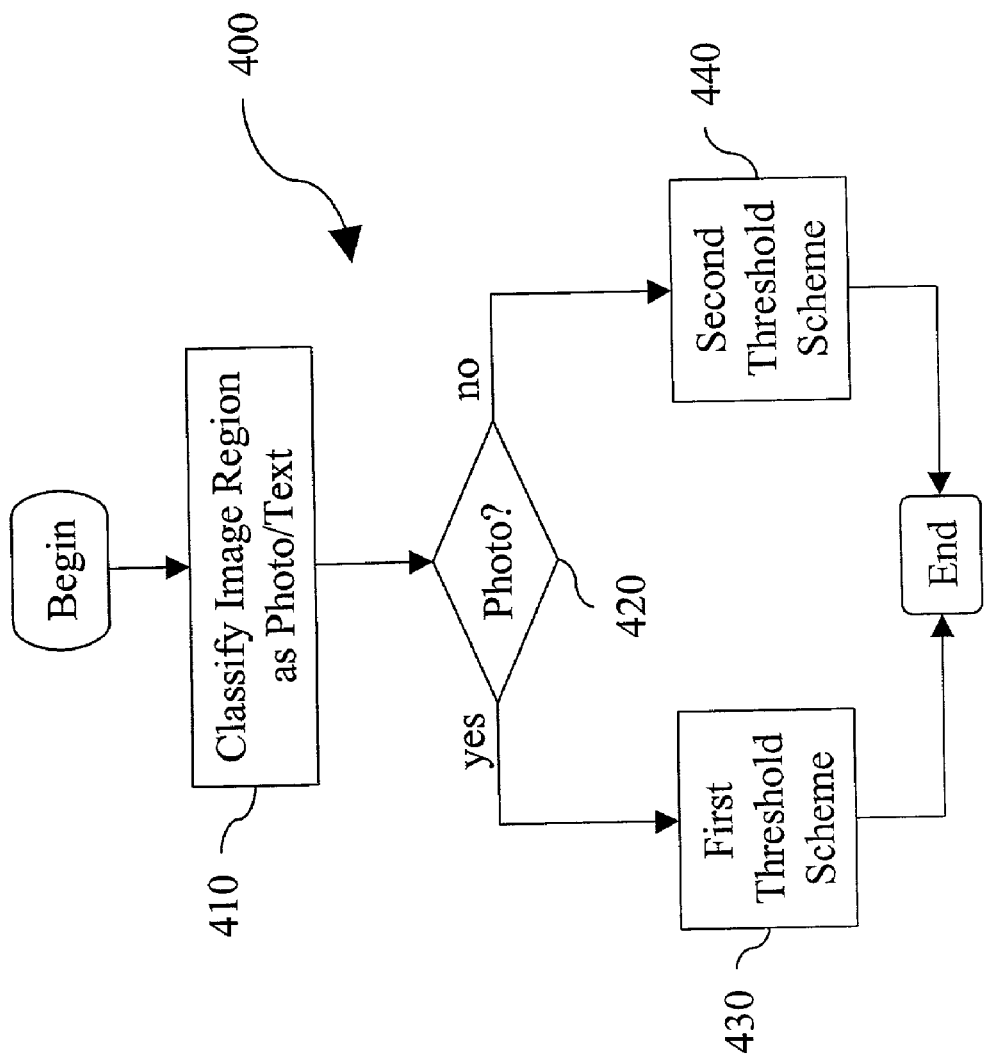
FIG. 4 is a functional block diagram depicting an embodiment of the present invention that selects between a first threshold scheme and a second threshold scheme upon classification of a region of an image.

FIG. 4 is a functional block diagram 400 depicting an embodiment of the present invention that selects between a first threshold scheme and a second threshold scheme upon classification of a region of an image. In a block 410, an image region is classified as being either a substantially image-like region or a substantially text-like region. Based upon the classification performed for the image region in the block 410, in a decision block 420, a decision is performed whether to apply either a first threshold scheme in a block 430 or a second threshold scheme in a block 440. The selection of either the first threshold scheme in the block 430 or the second threshold scheme in the block 440 is made primarily as a function of the classification of the image region in the block 410 as being a substantially photo-like region. If the image region is a substantially photo-like region, the first threshold scheme is applied in the block 430. Alternatively, if the image region is not a substantially photo-like region, the second threshold scheme is applied in the block 440.

Similar to the functional block diagram 300 of FIG. 3, all of the functional blocks performed in the functional block diagram 400 of FIG. 4 may be performed using the image processing systems 110 and 200 described in FIGS. 1 and 2. For example, the classification of the image region as being either a substantially image-like region or a substantially text-like region, performed in the block 410 of FIG. 4, is performed using the image classifier 230 of FIG. 2 in one embodiment of the invention. Similarly, the selection of the appropriate threshold scheme as determined by the decisional block 420 in FIG. 4 is performed and each of the first and second threshold schema applied in the blocks 430 and 440, respectively, are applied using the white edge detector 210 and the black edge detector 220 in FIG. 2. That is to say, the first threshold scheme that is selected in the block 430 of FIG. 4 is performed using the white edge detector 210 of FIG. 2. Similarly, the second threshold scheme that is selected in the block 440 of FIG. 4 is performed using the black edge detector 220 of FIG. 2.

Figure 5:
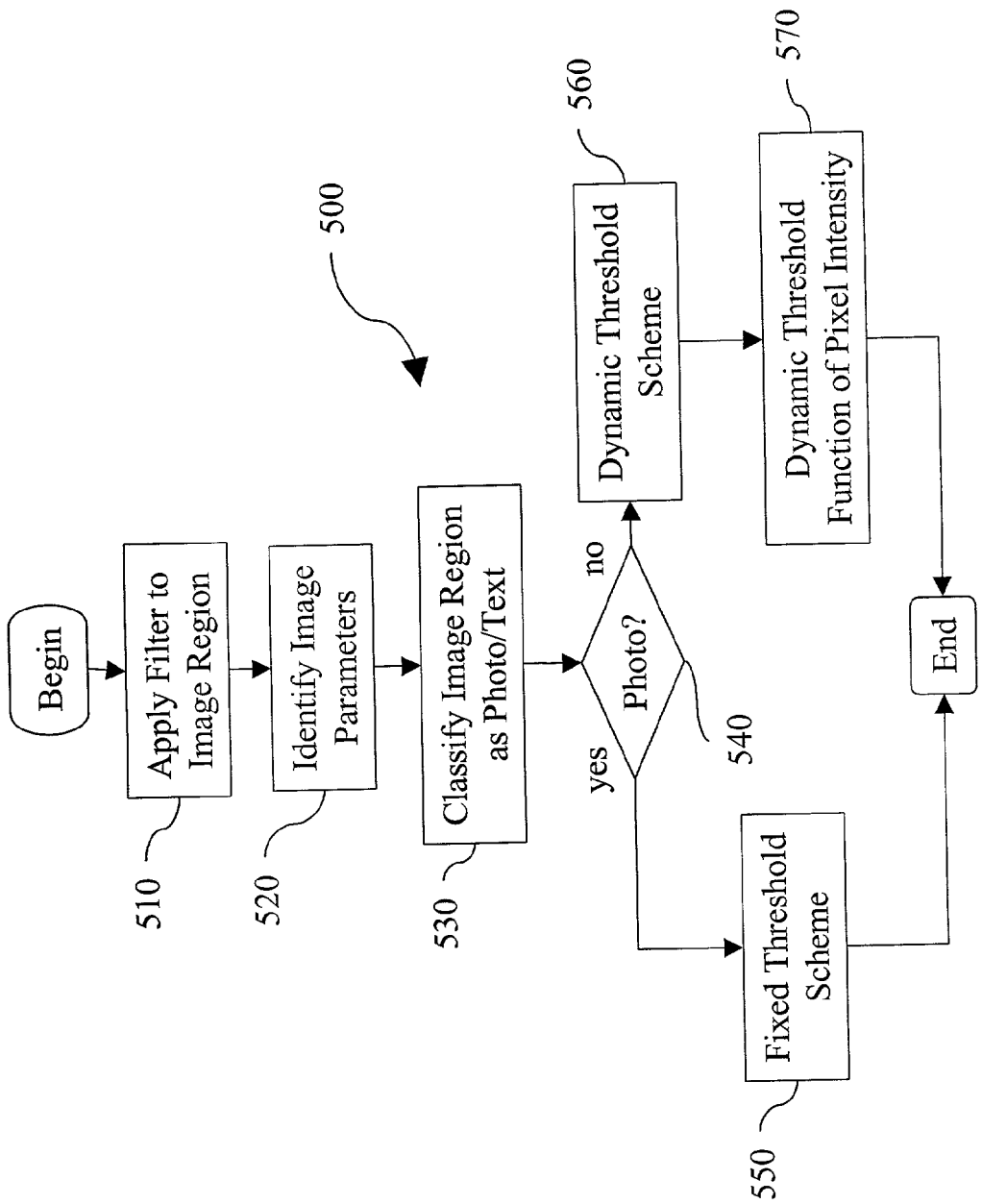
FIG. 5 is a functional block diagram depicting a specific embodiment of the functional block diagram of FIG. 4 that selects between a fixed threshold scheme and a dynamic threshold scheme upon classification of a region of an image.

FIG. 5 is a functional block diagram 500 depicting a specific embodiment of the functional block diagram 400 of FIG. 4 that selects between a fixed threshold scheme and a dynamic threshold scheme upon classification of a region of an image. In a block 510, a filter is applied to an image region of a plurality of image data. A predetermined number of image parameters are identified in a block 520. These image parameters constitute a variety of image characteristics roughness, smoothness, intensity, contrast and other characteristics known to those skilled in the art if image processing. In a block 530, the image region is classified as being either a substantially image-like region or a substantially text-like region. Based upon the classification performed for the image region in the block 530, in a decision block 540, a decision is performed whether to apply either a fixed threshold scheme in a block 550 or a dynamic threshold scheme in a block 560. When the dynamic threshold scheme of the block 560 is selected upon the classification performed in the block 530 of the image region being a substantially non-photo-like image region, in a block 570, the dynamic threshold is determined as a function of the pixel intensity of the plurality of image data contained within the image region. The determination of the dynamic threshold as a function of the pixel intensity, as performed in the block 570, is a function of at least one pixel within the image region. The intensity of the pixel region is one of the parameters identified in the block 520. The selection of either the fixed threshold scheme in the block 550 or the dynamic threshold scheme in the block 560, followed by determining the dynamic threshold as a function of the at least one pixel intensity in the block 570, is made primarily as a function of the classification of the image region in the block 530 as being a substantially photo-like region. If the image region is a substantially photo-like region, the fixed threshold scheme is applied in the block 550. Alternatively, if the image region is not a substantially photo-like region, the dynamic threshold scheme is applied in the block 560 wherein the dynamic threshold is determined as a function of the at least one pixel intensity in the block 570. In certain embodiments of the invention, the dynamic threshold, determined as a function of the at least one pixel intensity in the block 570, is determined by using a predetermined number of pixels associated with one particular pixel within the image region. For example, as will be discussed below, when performing processing on one particular pixel, the pixels immediately surrounding the particular pixel govern the determination of the dynamic threshold scheme.

Similar to the functional block diagrams 300 of FIG. 3 and 400 of FIG. 4, all of the functional blocks performed in the functional block diagram 500 of FIG. 5 may be performed using the image processing systems 110 and 200 described in FIGS. 1 and 2. For example, the classification of the image region as being either a substantially image-like region or a substantially text-like region, performed in the block 530 of FIG. 5, is performed using the image classifier 230 of FIG. 2 in one embodiment of the invention. Similarly, the selection of the appropriate threshold scheme as determined by the decisional block 540 in FIG. 5 is performed and the fixed and dynamic threshold schema applied in the blocks 550 and 560, respectively, are applied using the white edge detector 210 and the black edge detector 220 in FIG. 2. That is to say, the fixed threshold scheme that is selected in the block 550 of FIG. 5 is performed using the white edge detector 210 of FIG. 2. Similarly, the dynamic threshold scheme that is selected in the block 560 of FIG. 5 is performed using the black edge detector 220 of FIG. 2.

Figure 6:
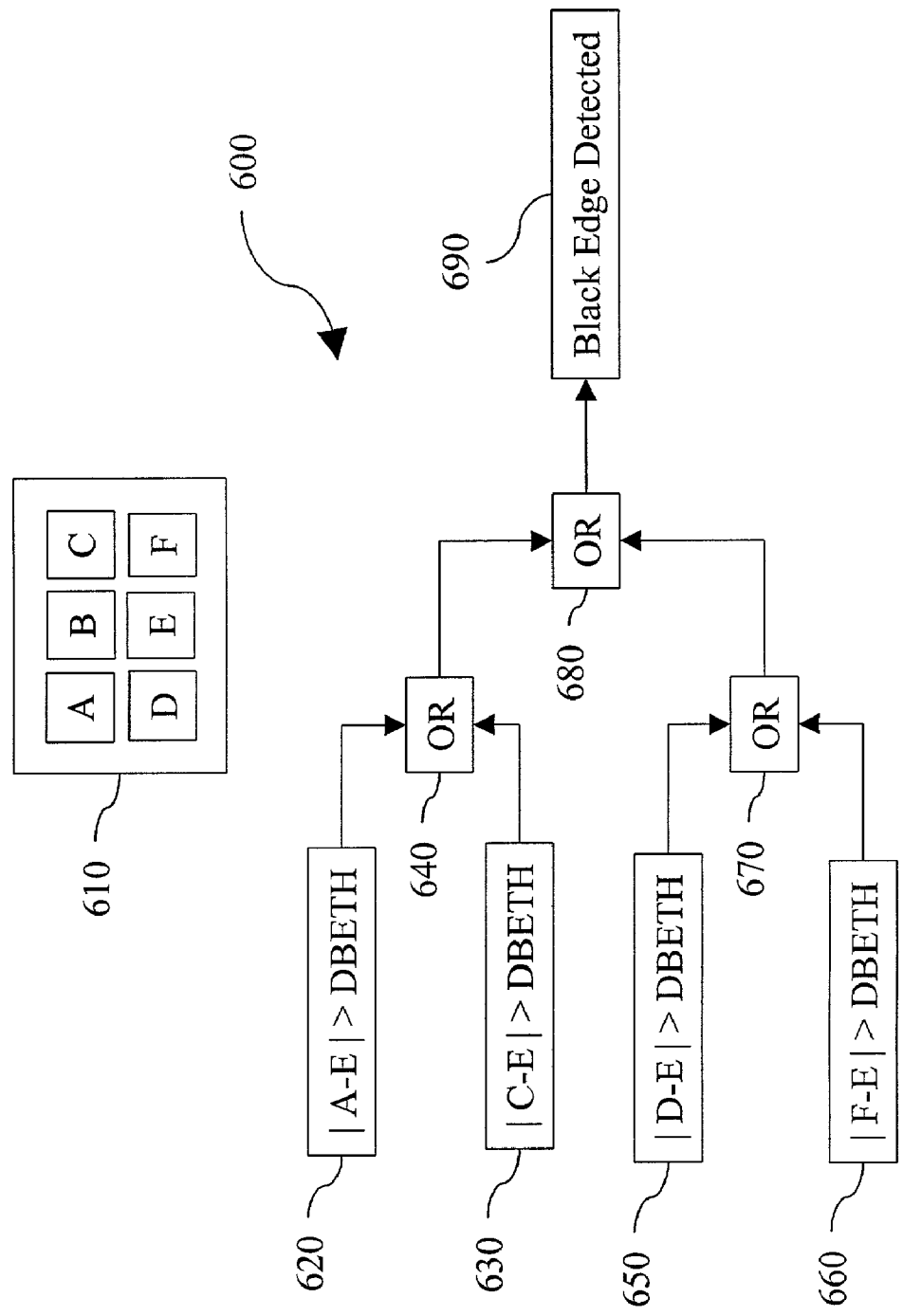
FIG. 6 is a functional block diagram of the present invention that performs black edge detection.

FIG. 6 is a functional block diagram 600 of the present invention that performs black edge detection. A plurality of image data 610 in pixel form is shown to illustrate the operation of the functional block diagram 600 in accordance with the present invention. Each of the individual pixels (A, B, C, D, E and F) within the plurality of image data 610 are involved in performing the image processing within the functional block diagram 600. The black edge detection of the functional block diagram 600 is performed by comparing several of the individual pixels to one specific pixel within the plurality of image data 610. Within the functional block diagram 600, the one specific pixel that is being processed is pixel E. At least one characteristic of the one specific pixel E is compared to the adjacent pixels A, C, D and F. Several different parameters may constitute the at least one characteristic that is compared between pixels that constitute the plurality of image data 610 including contrast, intensity, color, and other characteristics known to those skilled in the art of image processing.

An absolute value difference between the at least one characteristic of pixel A and the at least one characteristic of pixel E in a block 620 is compared to a dynamic black edge threshold (DBETH). In a block 630, an absolute value difference between the at least one characteristic of pixel A and the at least one characteristic of pixel E is compared to the DBETH. Similarly, an absolute value difference between the at least one characteristic of pixel D and the at least one characteristic of pixel E in a block 650 is compared to the DBETH; in a block 660, an absolute value difference between the at least one characteristic of pixel F and the at least one characteristic of pixel E is compared to the DBETH. Using the logical OR operation known in the art, as shown in a block 640, if either the an absolute value difference between the at least one characteristic of pixel A and the at least one characteristic of pixel E in the block 620 is larger than the DBETH or the an absolute value difference between the at least one characteristic of pixel C and the at least one characteristic of pixel E in the block 630 is larger than the DBETH, then a logical TRUE is emitted from the block 640 to another logical OR operation performed in a block 680.

Similarly, if either the an absolute value difference between the at least one characteristic of pixel D and the at least one characteristic of pixel E in the block 650 is larger than the DBETH or the an absolute value difference between the at least one characteristic of pixel F and the at least one characteristic of pixel E in the block 660 is larger than the DBETH, then a logical TRUE is emitted from a block 670 to the logical OR operation performed in the block 680. The outputs from the logical OR operations performed in the blocks 640 and 670 are input to the logical OR operation performed in the block 680. The logical output, whether TRUE or FALSE, of the block 680 is used to determine in a block 690 the detection of a black edge within the plurality of image data 610. In short, if any one of the absolute value differences determined in the blocks 620, 630, 650, or 660 is found to be greater than the DBETH, then a black edge has been detected as shown in the block 690. Alternatively, if none of the absolute value differences determined in the blocks 620, 630, 650, or 660 is found to be TRUE, then a black edge has not been detected as shown in the block 690.

In certain embodiments of the invention, the absolute value difference between the at least one characteristic of the pixels is a pixel intensity. Alternatively, the absolute value difference between the at least one characteristic is a contrast. Any parameter used to characterize a pixel or the plurality of image data 610 known to those having skill in the art of image processing may be used to perform the operation as presented in the functional block diagram 600.

In one embodiment of the invention, the DBETH used in the functional block diagram 600 is determined as a function of the intensity of the one specific pixel E wherein the plurality of image data 610 is a substantially text-like region. It is adjusted during the processing of the plurality of image data 610, dynamically, as a function of the one specific pixel E that is being processed at a given time. When a new plurality of image data (not shown), is being processed using the functional block diagram 600, the intensity of an equivalent pixel to E (not shown) within the new plurality of image data (not shown) determines the DBETH for the new plurality of image data (not shown).

Figure 7:
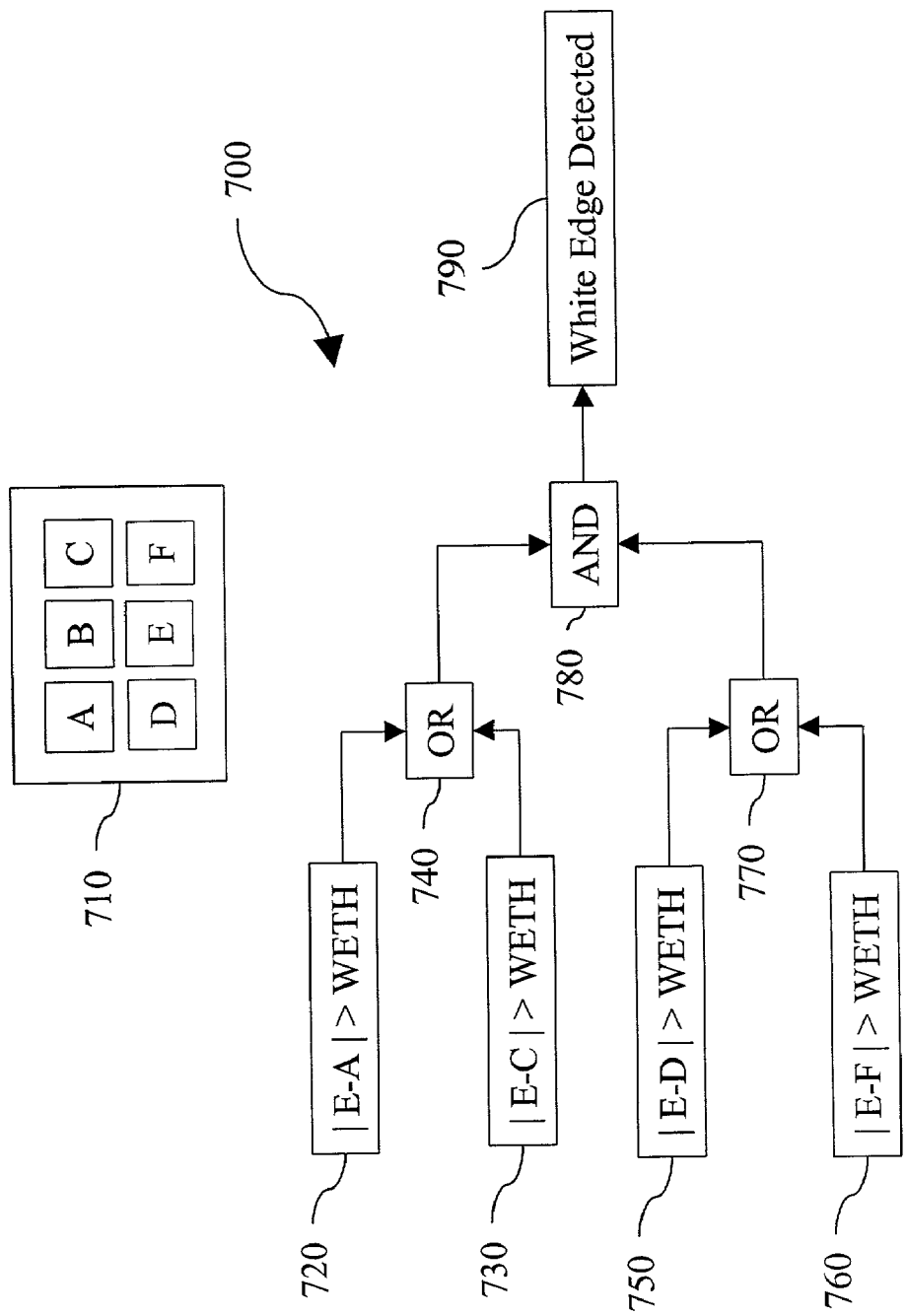
FIG. 7 is a functional block diagram of the present invention that performs white edge detection.

FIG. 7 is a functional block diagram 700 of the present invention that performs white edge detection. A plurality of image data 710 in pixel form is shown to illustrate the operation of the functional block diagram 700 in accordance with the present invention. Each of the individual pixels (A, B, C, D, E and F) within the plurality of image data 710 are involved in performing the image processing within the functional block diagram 700. The white edge detection of the functional block diagram 700 is performed by comparing several of the individual pixels to one specific pixel within the plurality of image data 710. Within the functional block diagram 700, the one specific pixel that is being processed is pixel E. At least one characteristic of the one specific pixel E is compared to the adjacent pixels A, C, D and F. Several different parameters may constitute the at least one characteristic that is compared between pixels that constitute the plurality of image data 710 including contrast, intensity, color, and other characteristics known to those skilled in the art of image processing.

An absolute value difference between the at least one characteristic of pixel A and the at least one characteristic of pixel E in a block 720 is compared to a white edge threshold (WETH). In a block 730, an absolute value difference between the at least one characteristic of pixel C and the at least one characteristic of pixel E is compared to the WETH. Similarly, an absolute value difference between the at least one characteristic of pixel D and the at least one characteristic of pixel E in a block 750 is compared to the WETH; in a block 760, an absolute value difference between the at least one characteristic of pixel F and the at least one characteristic of pixel E is compared to the WETH. Using the logical OR operation known in the art, as shown in a block 740, if either the an absolute value difference between the at least one characteristic of pixel A and the at least one characteristic of pixel E in the block 720 is larger than the WETH or the an absolute value difference between the at least one characteristic of pixel C and the at least one characteristic of pixel E in the block 730 is larger than the WETH, then a logical TRUE is emitted from the block 740 to a logical AND operation performed in a block 780.

Similarly, if either the an absolute value difference between the at least one characteristic of pixel D and the at least one characteristic of pixel E in the block 750 is larger than the WETH or the an absolute value difference between the at least one characteristic of pixel F and the at least one characteristic of pixel E in the block 760 is larger than the WETH, then a logical TRUE is emitted from a block 770 to the logical AND operation performed in the block 780. The outputs from the logical OR operations performed in the blocks 740 and 770 are input to the logical AND operation performed in the block 780. The logical output, whether TRUE or FALSE, of the block 780 is used to determine in a block 790 the detection of a white edge within the plurality of image data 710. In short, if at least one of the absolute value differences determined in the blocks 720 or 730 is greater than the WETH, as well as at least one of the absolute value differences determined in the blocks 750 or 760 is greater than the WETH, then a white edge has been detected as shown in the block 790. Alternatively, if both of the absolute value differences determined in the blocks 720 or 730 are found to be less than the WETH, or if both of the absolute value differences determined in the blocks 750 or 760 are found to be less than the WETH, then a white edge has not been detected as shown in the block 790.

In certain embodiments of the invention, the absolute value difference between the at least one characteristic of the pixels is a pixel intensity. Alternatively, the absolute value difference between the at least one characteristic is a contrast. Any parameter used to characterize a pixel or the plurality of image data 710 known to those having skill in the art of image processing may be used to perform the operation as presented in the functional block diagram 700. When contrast is used for the at least one characteristic of the pixels, a white edge is found only when the absolute value difference of the contrast in both a horizontal and a vertical direction exceed the WETH.

In one embodiment of the invention, the WETH used in the functional block diagram 700 is a fixed threshold wherein the plurality of image data 710 is a substantially photo-like region. When a new plurality of image data (not shown), is being processed using the functional block diagram 700, and it is found to be a substantially text-like region, the same fixed threshold is used within the new plurality of image data (not shown) for the WETH in processing the new plurality of image data (not shown).

In view of the above detailed description of the present invention and associated drawings, other modifications and variations will now become apparent to those skilled in the art. It should also be apparent that such other modifications and variations may be effected without departing from the spirit and scope of the present invention.

The invention claimed is:

1. An image processing method used to perform edge-enhancement to an image having varying characteristics, the method comprising:
   classifying the image as being at least one of a first image type and a second image type using at least one of the varying characteristics of the image;
   selecting and applying a first threshold or a second threshold upon identification of at least one of the varying characteristics of the image; and
   comparing two or more pixels to a single test pixel to determine whether a white edge exists.

2. The method of claim 1, further comprising filtering at least a portion of the image.

3. The method of claim 1, wherein the first threshold is a substantially dynamic threshold.

4. The method of claim 1, wherein the threshold is a substantially constant threshold.

5. The method of claim 1, wherein the at least one of the varying characteristics is a pixel characteristic determined using at least one additional pixel characteristic from at least one additional pixel.

6. An image processing system that performs edge-enhancement on an image having varying characteristics, the image processing system comprising:
   an image classifier that identifies the image as being at least one of a first image type and a second image type using at least one of the varying characteristics of the image; and
   a processing circuit that, upon identification of the at least one of the varying characteristics of the image, selectively applies a first threshold or a second to the image; and
   a white edge detector comparing two or more pixels to a single test pixel.

7. The image processing system of claim 6, further comprising a white edge detector applying a dynamic white edge threshold.

8. The image processing system of claim 6, wherein the at least one of the varying characteristics is a pixel characteristic determined using at least one additional pixel characteristic from at least one additional pixel.

9. The image processing system of claim 6, wherein the at least one of the varying characteristics is a pixel intensity.

10. An image processing system that performs edge-enhancement on an image having varying characteristics, the image processing system comprising:
    an image classifier that identifies the image as being at least one of a first image type and a second image type using at least one of the varying characteristics of the image; and
    a processing circuit that, upon identification of the at least one of the varying characteristics of the image, selectively applies a first threshold or a second to the image; and
    a white edge detector comparing a single test pixel to a first adjacent pixel to generate a first difference, comparing the test pixel to a second adjacent pixel to generate a second difference, comparing the test pixel to a third adjacent pixel to generate a third difference, and comparing the test pixel to a fourth adjacent pixel to generate a fourth difference, and generating a white edge detection when any of the first difference or the second difference and the third difference or the fourth difference are greater than a threshold.

11. The image processing system of claim 10 wherein the threshold is a dynamic threshold.

12. The image processing system of claim 10 wherein the first adjacent pixel and the second adjacent pixel are not adjacent to each other.

13. An image processing system that performs edge-enhancement on an image having varying characteristics, the image processing system comprising:
    an image classifier that identifies the image as being at least one of a first image type and a second image type using at least one of the varying characteristics of the image; and
    a processing circuit that, upon identification of the at least one of the varying characteristics of the image, selectively applies a first threshold or a second to the image; and
    a white edge detector comparing a single test pixel to a first adjacent pixel to generate a first difference and comparing the test pixel to a second adjacent pixel to generate a second difference, and generating a white edge detection when the first difference and the second difference are each greater that a threshold.

14. An image processing system that performs edge-enhancement on an image having varying characteristics, the image processing system comprising:

an image classifier that identifies the image as being at least one of a first image type and a second image type using at least one of the varying characteristics of the image; and a processing circuit that, upon identification of the at least one of the varying characteristics of the image, selectively applies a first threshold or a second to the image; and a white edge detector comparing a single test pixel to one or more first adjacent pixels to generate a first difference and comparing the test pixel to one or more second adjacent pixels to generate a second difference, and generating a white edge detection when the first difference and the second difference are each greater than a threshold.

15. An edge detection circuit comprising:

a first test pixel comparator comparing a test pixel to one or more first adjacent pixels, generating a first difference, and determining whether the first difference is greater than a first threshold;

a second test pixel comparator comparing the test pixel to one or more second adjacent pixels, generating a second difference, and determining whether the second difference is greater than a second threshold; and an edge detector receiving the determination from the first test pixel comparator and the second test pixel comparator and generating an edge detection.

16. The edge detection circuit of claim 15 wherein the first threshold and the second threshold are the same.

17. The edge detection circuit of claim 15 wherein the first threshold and the second threshold are dynamic.

18. The edge detection circuit of claim 15 wherein the first test pixel comparator further comprises:

a first sub-comparator comparing the test pixel to one of the first adjacent pixels to generate a first sub-difference and determining whether the first sub-difference is greater than a first sub-threshold;

a second sub-comparator comparing the test pixel to another of the first adjacent pixels to generate a second sub-difference and determining whether the second sub-difference is greater than a second sub-threshold; and outputting an indication that the first difference is greater than the first threshold if either the first sub-difference is greater than the first sub-threshold or the second sub-difference is greater than the second sub-threshold.

19. The edge detection circuit of claim 18 wherein the second test pixel comparator further comprises:

a third sub-comparator comparing the test pixel to one of the second adjacent pixels to generate a third sub-difference and determining whether the third sub-difference is greater than a third sub-threshold;

a fourth sub-comparator comparing the test pixel to another of the second adjacent pixels to generate a fourth sub-difference and determining whether the fourth sub-difference is greater than a fourth sub-threshold; and outputting an indication that the second difference is greater than the second threshold if either the third sub-difference is greater than the third sub-threshold or the fourth sub-difference is greater than the fourth sub-threshold.

20. The edge detection circuit of claim 19 wherein the first sub-threshold, the second sub-threshold, the third sub-threshold, and the fourth sub-threshold are the same.

21. The edge detection circuit of claim 19 wherein the first sub-threshold, the second sub-threshold, the third sub-threshold, and the fourth sub-threshold are dynamic.

22. The edge detection circuit of claim 19 wherein the one of the first adjacent pixels is not adjacent to the other of the first adjacent pixels, and the one of the second adjacent pixels is not adjacent to the other of the second adjacent pixels.

* * * * *